(12) United States Patent
Grayson et al.

(10) Patent No.: US 8,644,253 B2
(45) Date of Patent: Feb. 4, 2014

(54) PICOCELL SYSTEM WITH LOCAL VOICE MEDIA SUPPORT

(75) Inventors: Mark Grayson, Maidenhead (GB); Eric P. Hamel, Paris (FR); Jonathan D. Rosenberg, Freehold, NJ (US)

(73) Assignee: Cisco Technology, Inc., San Jose, CA (US)

( * ) Notice: Subject to any disclaimer, the term of this patent is extended or adjusted under 35 U.S.C. 154(b) by 895 days.

(21) Appl. No.: 12/571,893

(22) Filed: Oct. 1, 2009

(65) Prior Publication Data

US 2011/0019612 A1  Jan. 27, 2011

Related U.S. Application Data

(60) Provisional application No. 61/228,183, filed on Jul. 24, 2009.

(51) Int. Cl.
*H04W 4/00* (2009.01)

(52) U.S. Cl.
USPC ........................................................ 370/331

(58) Field of Classification Search
USPC ........................................................ 370/331
See application file for complete search history.

(56) References Cited

U.S. PATENT DOCUMENTS

| | | | | |
|---|---|---|---|---|
| 7,574,212 | B2 * | 8/2009 | McConnell et al. | 455/437 |
| 8,335,187 | B2 * | 12/2012 | Wilhoite et al. | 370/331 |
| 2002/0024943 | A1 * | 2/2002 | Karaul et al. | 370/338 |
| 2008/0267128 | A1 * | 10/2008 | Bennett et al. | 370/331 |
| 2009/0080382 | A1 * | 3/2009 | Chen et al. | 370/331 |
| 2010/0238920 | A1 * | 9/2010 | Salkintzis et al. | 370/357 |

OTHER PUBLICATIONS

3GPP TS 23.206, "Voice Call Continuity, (VCC) between Circuit Switched (CS) and IP Multimedia Subsystem (IMS); Stage 2 (Release 7)", V7.5.0, Global System for Mobile Communications, Dec. 2007.

\* cited by examiner

*Primary Examiner* — Luat Phung
*Assistant Examiner* — Saad A Waqas
(74) *Attorney, Agent, or Firm* — Edell, Shapiro & Finnan, LLC (57) ABSTRACT

A methodology includes servicing a voice call between mobile User Equipment and an Enterprise Session Initiation Protocol (SIP) Services Environment using, at least in part, Voice over Internet Protocol Multimedia Subsystem (VoIMS), detecting that the User Equipment is moving out of range of Radio Access Point (RAP) infrastructure servicing the User Equipment, and in response to detecting, initiating a procedure to hand out the voice call and anchor the voice call in a Mobile Switching Center (MSC) of a macro service provider.

17 Claims, 8 Drawing Sheets

PICOCELL SYSTEM WITH LOCAL VOICE MEDIA SUPPORT

This application claims the benefit of U.S. Provisional Application No. 61/228,183, filed Jul. 24, 2009, which is incorporated herein by reference in its entirety.

TECHNICAL FIELD

The present disclosure relates to enhanced mobile communication infrastructure extensions and deployments.

BACKGROUND

Femtocell access point devices are radio access point devices that are deployed at subscriber sites in order to improve coverage of mobile wireless communication service (e.g., cell phone, wireless messaging, etc.) and thereby offload the burden from the "macro" (e.g., conventional cell tower) infrastructure of the mobile service provider. Picocell access point devices operate substantially similarly to femtocell access point devices, but are typically more powerful and support more channels than femtocell access point devices. Both access point devices, as well as other like access point devices (sometimes referred to herein as "radio access points" or "RAPs") function, essentially, as cellular (or "cell") transceiver towers in the macro network.

RAPs are increasingly being operated within buildings and other facilities where conventional cellular tower service might not be available or where an enterprise (that is housed within the building or facilities) would prefer to provide service directly to a user (e.g., a mobile phone user) of a RAP.

DESCRIPTION OF EXAMPLE EMBODIMENTS

Overview

A methodology includes servicing a voice call between mobile User Equipment and an Enterprise Session Initiation Protocol (SIP) Services Environment using, at least in part, Voice over Internet Protocol Multimedia Subsystem (VoIMS), detecting that the User Equipment is moving out of range of Radio Access Point (RAP) infrastructure servicing the User Equipment, and in response to detecting, initiating a procedure to hand out the voice call and anchor the voice call in a Mobile Switching Center (MSC) of a macro service provider.

Figure 1:
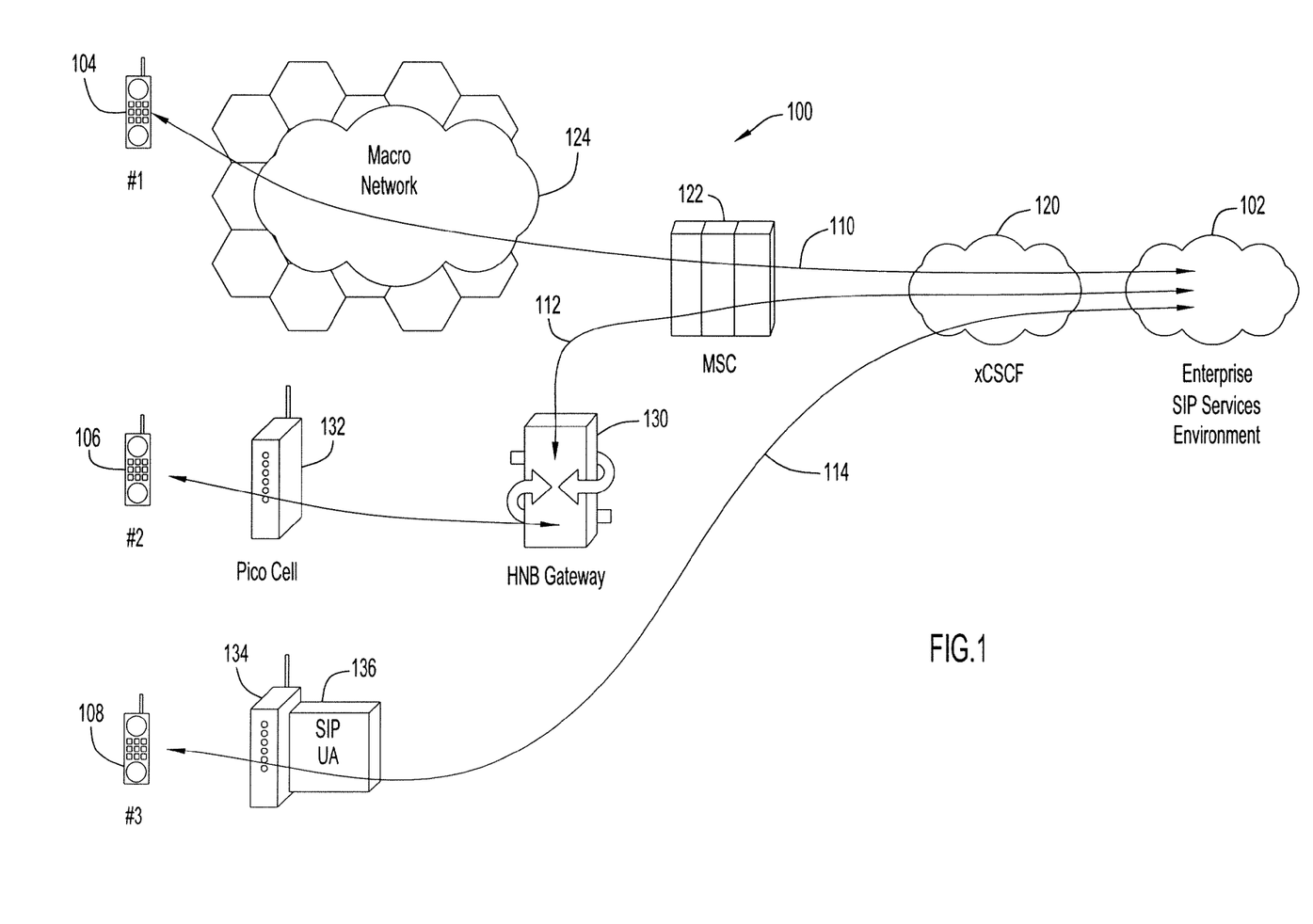
FIG. 1 shows how User Equipment can gain access to Enterprise services via Session Initiation Protocol (SIP) services.

FIG. 1 shows a converged Enterprise Session Initiation Protocol (SIP) Services Environment 102 that can communicate with User Equipment (UE) 104, 106, and 108 via one of several possible paths 110, 112, or 114. Path 110 includes Call State Control Function (xCSCF) 120 for IMS, Mobile Switching Center (MSC) 122 and macro network 124 (including, e.g., conventional cell towers). Path 112 is similar to path 110, except instead of the MSC 122 passing the call via the macro network 124, the call is instead routed via a Home Node B Gateway (HNB-GW) 130 that serves as a bridge between any number of picocells 132 and the MSC 122. While the following description is focused on picocell infrastructure or systems, those skilled in the art will appreciate that a picocell is but one type of Radio Access Point (RAP) and that other types of RAPs may be employed in connection with the systems and methodologies described herein.

Finally, path 114 can support a call between the Enterprise SIP Services Environment 102 and UE 108 without any reliance on MSC 122 or HNB-GW 130. Such a call, as will be described in more detail later herein, is enabled by a SIP User Agent 136, typically implemented directly in or co-located with picocell 134.

Thus, FIG. 1 shows how a mobile user can access the converged environment 102 from the macro-cellular network 124. As well, a mobile user can use picocell infrastructure 130, 132 to access the converged environment 102 via the MSC 122 or, access can be gained using picocell 134 and SIP UA 136. It is noted that picocells 132 and 134 may be the same picocell and be configurable to reach the Enterprise SIP Services Environment 102 via either an HNB-GW or directly via a SIP UA.

So-called first generation picocell architectures offered restricted services including Ethernet access, power over Ethernet, and Wide Area Network (WAN) connectivity from the Enterprise network. Now, with the ability to connect User Equipment directly to the Enterprise environment (or what is sometimes referred to as the converged Enterprise Unified Collaboration and Communication (UC&C) environment) via, e.g., path 114, picocell architecture can enable suitably authorized enterprise employees to access the enterprise voice service domain (e.g., a private branch exchange (PBX)) directly from the on-premise picocell infrastructure.

More specifically, direct access to the Enterprise SIP Service Environment 102 is enabled by, e.g., co-locating SIP User Agent (UA) 136 with the on-premise picocell infrastructure (in this case picocell 134). The SIP UA 136 is responsible for performing a SIP REGISTER on behalf of the Circuit Switch (CS) attached mobile User Equipment 108.

Because picocell infrastructure is typically open access, meaning that any UE can register, it may be desirable to limit enhanced access (especially voice call support) to the Enterprise SIP Services Environment 102 to only, e.g., eligible enterprise employees. To differentiate among UEs (i.e., those eligible for enhanced service and those not), the Third Generation Partnership Project (3GPP) 25.469 "HNB Application Part (AP) UE" REGISTRATION message exchange (depicted in FIG. 2) is preferably enhanced to provide the on premise equipment (namely, picocell 134) with an indication that a particular UE is authorized to receive local voice services directly from the Enterprise SIP Service Environment 102 and, in addition, provide the necessary information so that the Registration in this regard can be performed.

Figure 2:
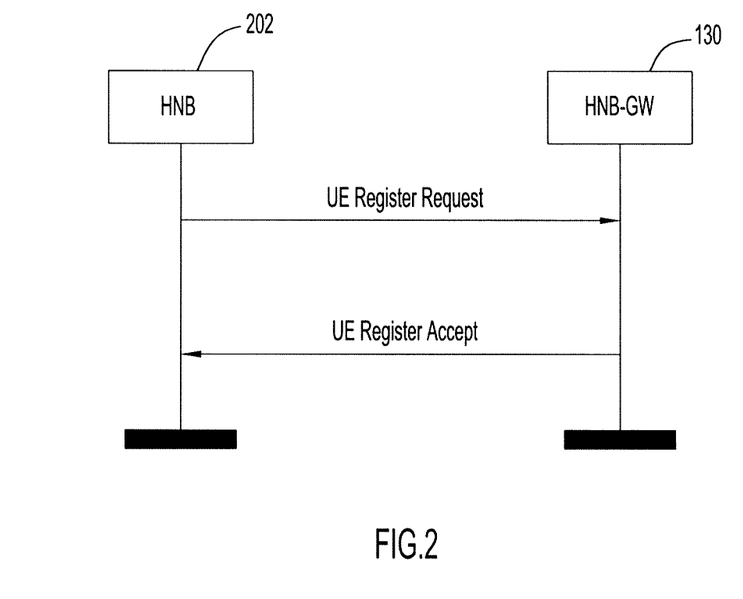
FIG. 2 shows an initial message exchange between a Home Node B (HNB) and HNB Gateway (HNB-GW)
Figure 4:
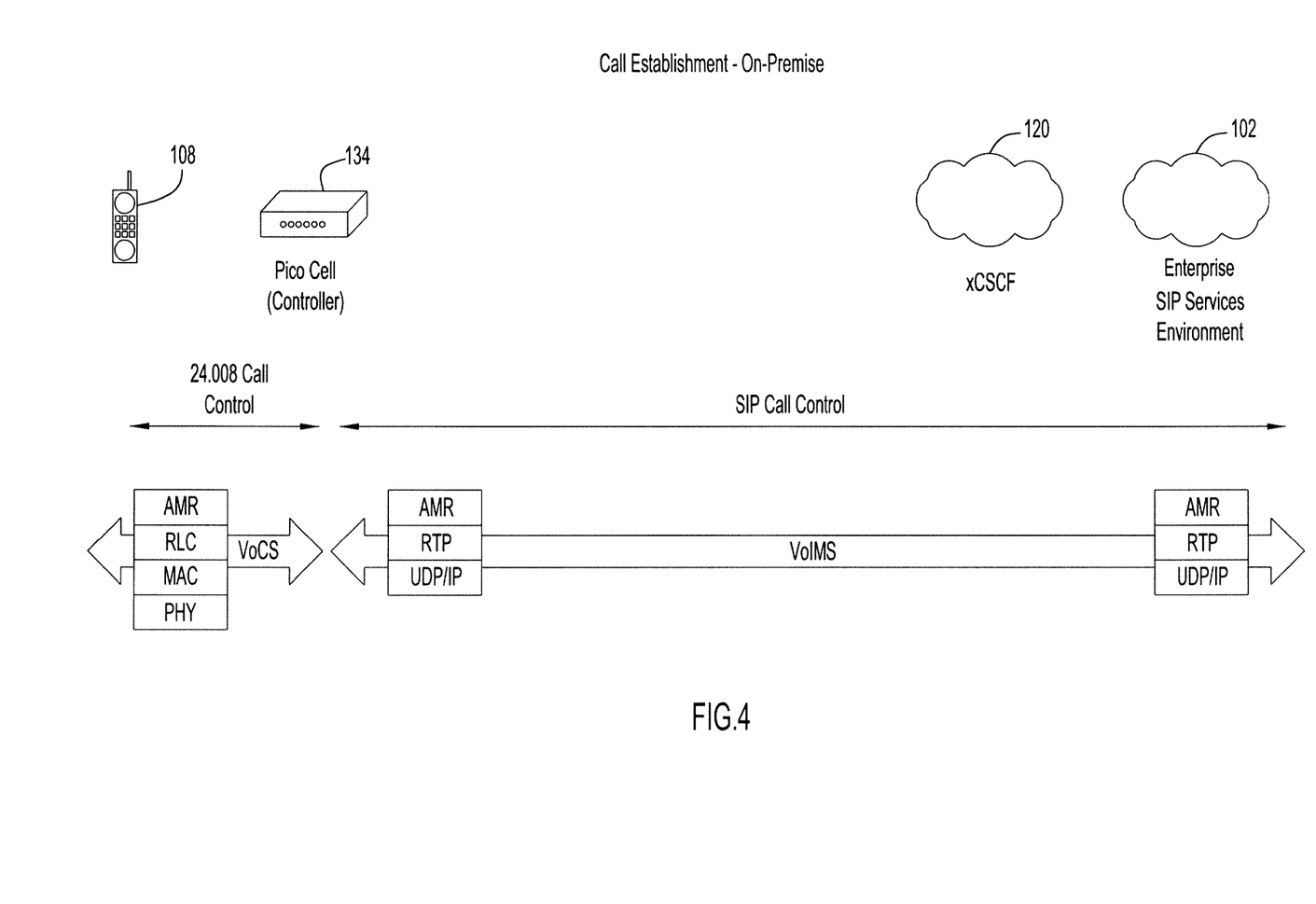
FIG. 4 depicts on premise Enterprise call establishment.

More specifically, as shown in FIG. 2, in accordance with the typical registration process, an HNB 202 (e.g., a picocell)

will generate and send a HNBAP UE REGISTER REQUEST to the HNB-GW 130. In the Table below, two additional pieces of information are provided back to the HNB 202 in the UE REGISTER ACCEPT message. These extended pieces of information include (1) whether the UE is in fact an Authorized Enterprise User and (2) SIP registration information including, e.g., an MSISDN of the UE.

over the radio interface (between the UE 108 and the picocell 134 and pursuant to 3GPP Technical Specification 24.008 "Mobile radio interface Layer 3 specification; Core network protocols; Stage 3") and the SIP signaling sent to the Enterprise SIP Service Environment, as shown in FIG. 4. More specifically, the picocell infrastructure is responsible for interworking the media (i.e., the voice call) between AMR/

Extensions to UE REGISTER ACCEPT Message

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| UE Identity | M | | 9.2.17 | | YES | reject |
| Context-ID | M | | 9.2.9 | | YES | reject |
| Authorized Enterprise User (new) | | | | Enterprise RAB resource/ Enterprise local data services/ Enterprise local voice services | | |
| SIP Registration Information (new) | | | | e.g., MSISDN | | |

At this point, the HNB (again, e.g., the picocell 134) has knowledge that the UE that has just registered is eligible for enhanced services, including enterprise local voice services. The HNB or picocell also now has sufficient information to perform a SIP Registration on behalf of the User Equipment, for example, including the MSISDN of the UE registering on the picocell 134. When the authorized user moves out of the picocell environment, the picocell infrastructure is also responsible for deregistering the user.

Figure 3:
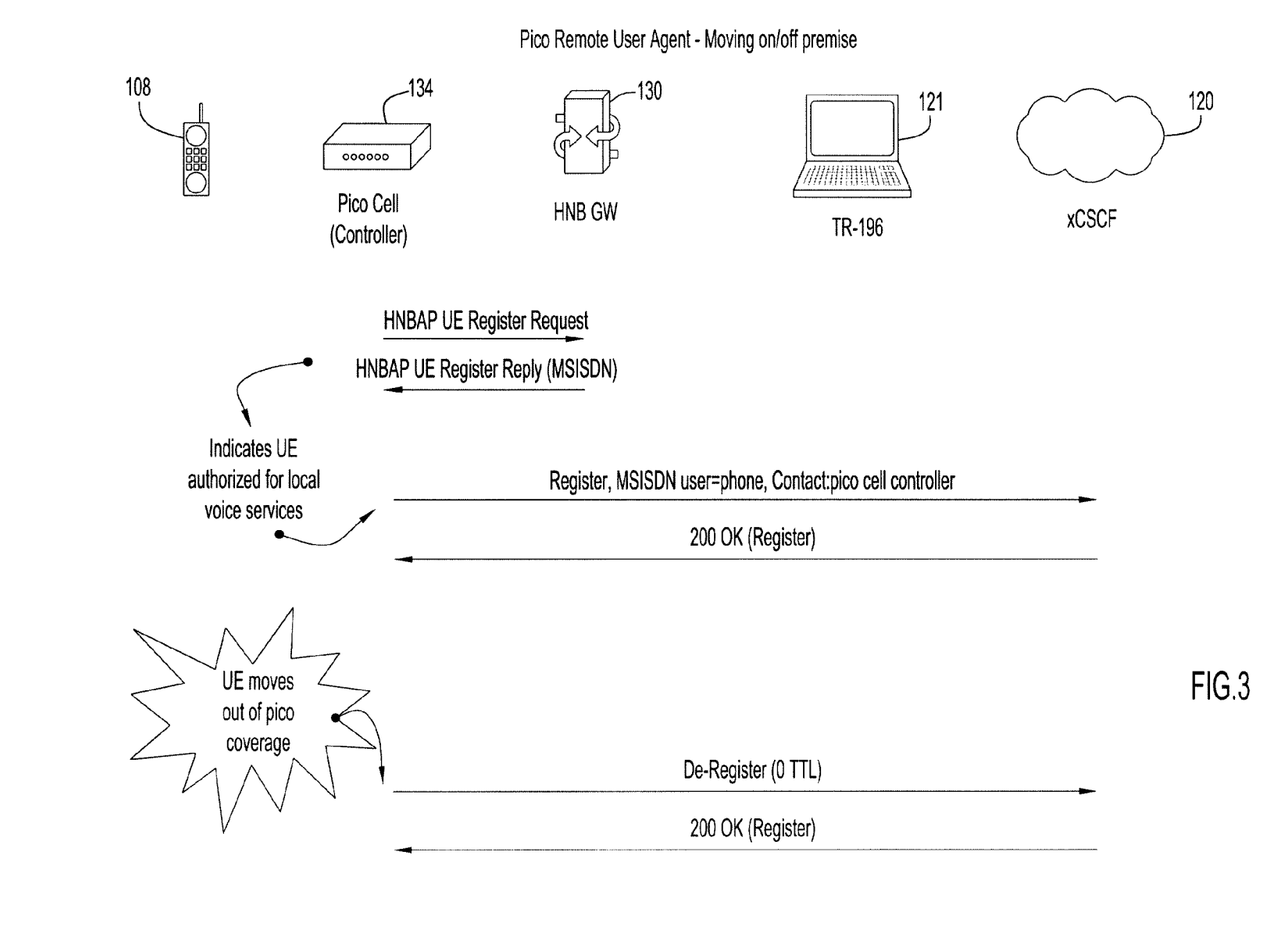
FIG. 3 shows picocell infrastructure registering on behalf of User Equipment (UE)

This overall process is shown in FIG. 3, where UE 108 first registers with a picocell infrastructure. As shown, the picocell 134 sends the HNBAP UE REGISTER REQUEST to the HNB-GW 130, and in reply, the HNB-GW 130 sends the HNBAP UE Register Reply (or Accept) message with the MSISDN of the UE. That message, either expressly or by implication indicates to the picocell 134 that the UE 108 is authorized for local voice services. Consequently, the picocell 134 (in conjunction with SIP UA 136 (not shown in FIG. 3) sends a SIP register message to xCSCF 120. That message includes the MSISDN of the UE and further indicates that the contact for this session is the picocell 134 (or a pico controller that controls multiple picocells). In reply to the SIP register message, xCSCF 120 generates a 200 OK (Register) message and IMS connectivity is established. Those skilled in the art will appreciate that it would typically be the UE itself that supports SIP functionality. Here, however, the picocell/UA performs SIP procedures on behalf of the UE. "TR-196," shown in FIG. 3 (and discussed later herein), enables the picocell infrastructure to recover the address of the xCSCF serving a particular user.

When the UE 108 moves out of picocell range, the picocell 134 (or controller) sends a SIP De-register (0 TTL) message to the xCSCF 120 and receives a 200 OK (Register) message in reply, thereby tearing down the IMS connection between the picocell and the Enterprise SIP Services Environment 102.

Having successfully registered the authorized user to the Enterprise SIP based Service Environment 102, the picocell 134 is thereafter responsible for interworking between the Non-Access Stratum Connection Management signaling sent RLC/MAC/PHY (adaptive multi rate coding, radio link control, media access control, physical) layers on the Circuit Switch side (pursuant to 3GPP 25 series specifications) and AMR/RTP/UDP/IP (adaptive multi rate coding, real time protocol, user data protocol, interne protocol) layers on the VoIMS side such that a voice call can be handled directly with the Enterprise SIP Service Environment 102.

Thus far, it has been shown how User Equipment 108 might directly access the Enterprise SIP Service Environment 102 using SIP and picocell infrastructure. It has also been shown how an IMS session might be ended by de-registering within SIP as a user moves out of coverage of picocell 134. However, it is possible that a mobile user might want to continue a voice call even after leaving the coverage area of a picocell infrastructure.

More specifically, a challenge for the architecture supporting direct access via SIP to the converged Enterprise Services Environment 102 is to support service continuity as the enterprise user (i.e., the user of the UE) with an already-established voice session moves off premise. There are a variety of ways to achieve such a function, including integrating partial MSC functionality on premise to allow the domain transfer to be realized as an inter-MSC handover.

Because of the significant issues of integrating new MSC/CAMEL/SS7 (Mobile Switching Center, Customized Applications for Mobile Enhanced Logic, Signaling System 7) functionality for the picocell specific architecture, provided instead is a reliance on IMS-defined Voice Call Continuity (VCC) application functionality, as specified in 3GPP Technical Specification 23.206 "Voice Call Continuity (VCC) between Circuit Switched (CS) and IP Multimedia Subsystem (IMS)" for performing the domain transfer. In this approach, the handset (UE) involved is a single-mode device and the domain transfer client functionality is integrated in the on-premise picocell infrastructure.

Figure 5:
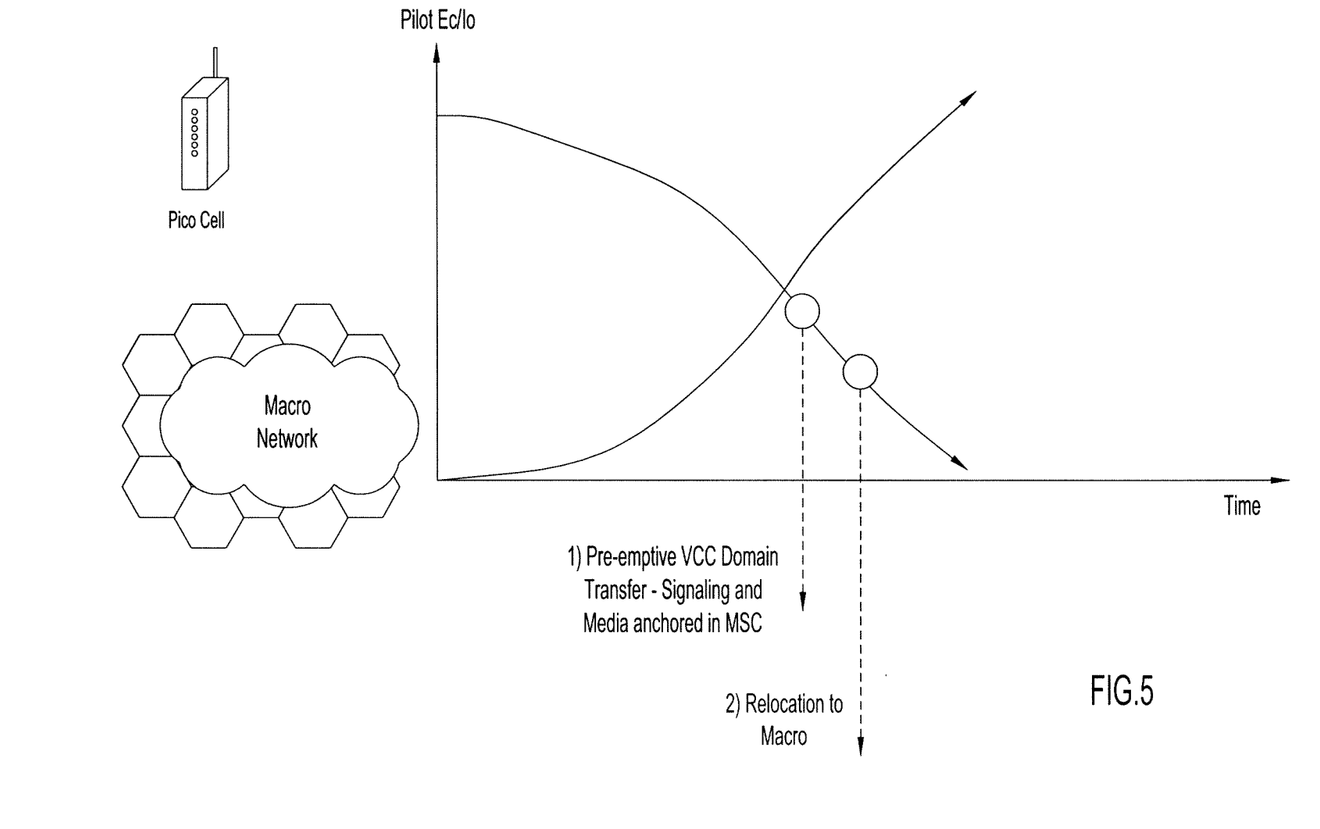
FIG. 5 shows call hand-out timing with respect to picocell and macro signal strength.

Note that because the Enterprise SIP Service Environment (ESSE) 102 can be accessed by users on the macro-cellular network via the MSC 122, the ESSE remains consistent throughout the procedure. This ensures that enterprise features executed in ESSE 102 accessed via path 114 can continue to be accessed via path 110 when the handset (UE) moves out of coverage of the picocell 134. Significantly, in order to support seamless hand-out from the enterprise towards the macro network, a pro-active domain transfer can be performed back to VoCS to ensure the call is re-anchored in the MSC 122 prior to triggering the re-location back to the macro network. More specifically, the picocell system is beneficially operable to detect in advance when hand-out of the picocell system will occur, for example because the user is moving out of coverage from the enterprise picocell system into the macro cellular coverage. This is illustrated in FIG. 5, which shows that as the signal strength of the picocell infrastructure decreases and that of the macro network increases, there is a time (point 1) at which pre-emptive VCC domain transfer is performed such that signaling and media is thereafter anchored in the MSC 122. At a subsequent point 2, relocation is actually performed or triggered, thus accomplishing the desired handover via Serving Radio Network Subsystem (SRNS) Relocation (as defined in 3GPP Technical Specification 25.413 "UTRAN Iu interface Radio Access Network Application Part (RANAP) signaling").

In one embodiment, the picocell system is operable to set thresholds associated with measurement reporting below those normally associated with relocation. In one such approach, standardized 3GPP Technical Specification 25.331 "Radio Resource Control (RRC); Protocol specification" signaling is used to set measurement reporting thresholds. Other variables can be used to trigger a CS leg establishment, including mobility of the UE, location of the UE within a building, etc.

Such an approach ensures that no new femtocell/picocell (or RAP) specific features are required on the MSC (e.g., compared to various options defined for consideration in 3GPP Technical Report 23.832 "IMS aspects of architecture for Home Node B (HNB)", and no new MSC-server functionality, including CAMEL support, is required to be co-located within the picocell infrastructure, i.e., the picocell itself or associated HNB-GW.

Figure 6:
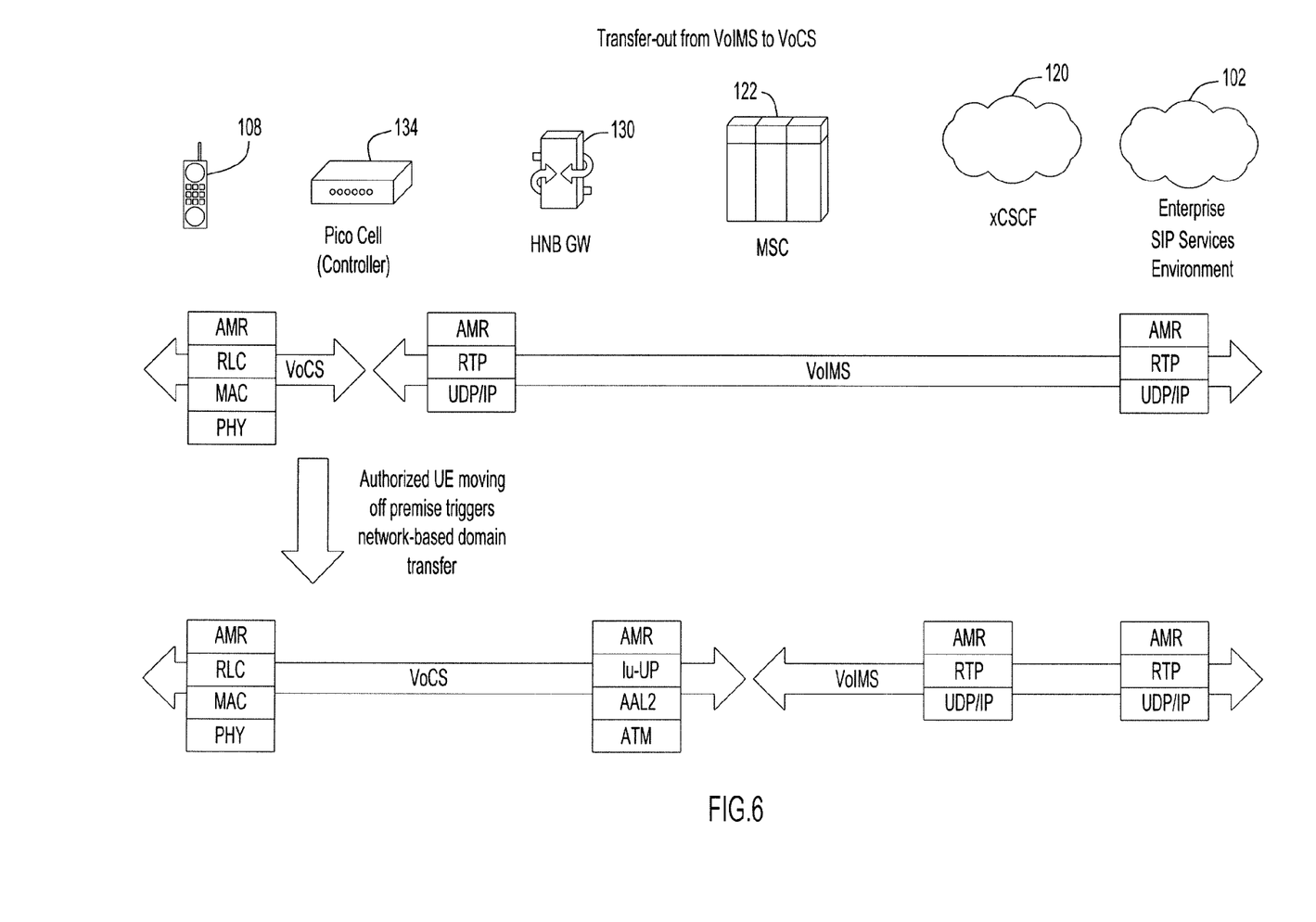
FIG. 6 shows a sequence for transfer out of a voice call from Voice over Internet Protocol Multimedia Subsystem (VoIMS) to Voice over Circuit Switch (VoCS)

Following the domain transfer, the on-premise picocell infrastructure 134 is responsible for interworking the media towards the MSC 122 over link 112, e.g., as shown in FIG. 6. More specifically, the top portion of FIG. 6 is the same as FIG. 4. Once hand off has been performed, the voice call must flow through the MSC via the macro network. This is shown in the bottom portion of FIG. 6 wherein the UE 108 is in contact with the MSC 122 via the HNB GW 130 using link 112.

A provisioning and management system is typically used to configure the Picocell 134 with radio parameters and allow establishment of the connection between the picocell 134 and HNB GW 130, for example using a standardized schema defined in Broadband Forum Technical Report TR-196 "Femto Access Point Service Data Model". For the domain transfer operation, the picocell infrastructure needs to be statically provisioned with the VCC Domain Transfer Number. This can be accomplished using an enhanced TR-196 schema for the enterprise picocell to allow provisioning of the Transfer Number by the provisioning and management system.

In order to trigger the transfer, standard VCC signaling is used with the picocell initiating a CS Call Setup to the Domain Transfer Number. A standard IMS VCC Applications Server, preferentially located in xCSCF 120, implements the domain transfer between VoIMS and VoCS, with the on-premise picocell infrastructure being responsible for identifying the BYE message for the transferred out session and to respond autonomously with a 200 OK message instead of forwarding the message to the UE, as shown in FIG. 7.

Figure 7:
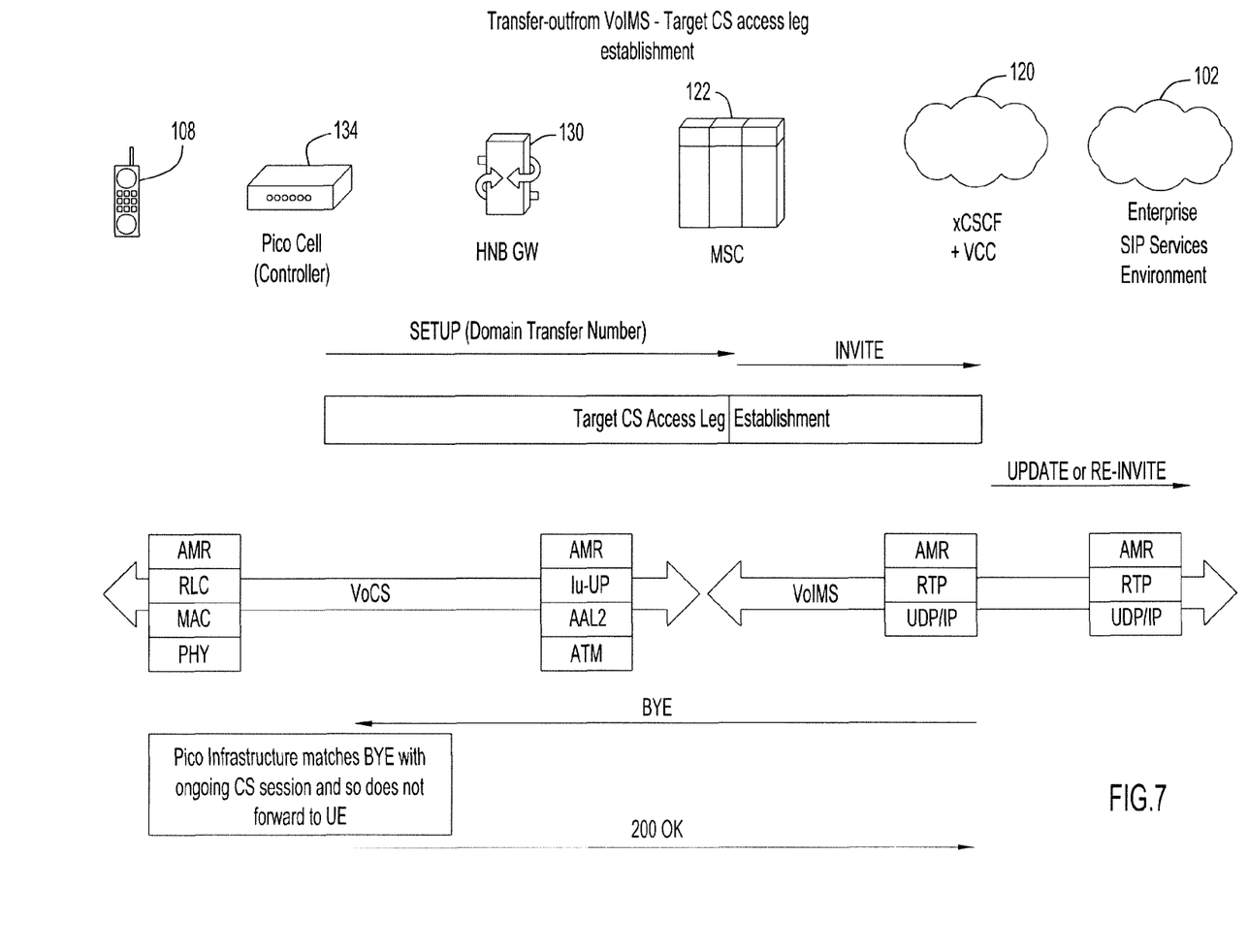
FIG. 7 shows a sequence for transfer out from VoIMS, including target Circuit Switch access leg establishment.

In other words, and as shown in FIG. 7, the picocell 134 causes a target CS access leg to be established by sending a SETUP message to the Domain Transfer Number, identifying a standard IMS VCC Applications Server. This causes an INVITE message to be generated and to be passed to the IMS VCC Application Server in xCSCF 120. An UPDATE or RE-INVITE message is, in turn, sent to the Enterprise SIP Services Environment 102. The BYE message sent by the xCSCF 120 is received by the picocell 134 and it is matched with the ongoing CS session. This BYE message is not passed to the UE 108. When the picocell 134 sends the 200 OK acknowledgement back to the xCSCF 120, that causes the MSC 122 to take over the "anchoring duties" for the call.

Thus, in an embodiment, a picocell infrastructure is operable to provide a picocell with configuration information concerning optimal routing/local media operation, including domain transfer E.164 numbers allowing CS and IMS signaling to be sent to a VCC component in the macro service provider's network. Normally, in VCC a UE is responsible for triggering IMS to CS domain transfer. However, in accordance with the methodology described herein, the picocell infrastructure is enhanced to itself trigger the handover from IMS to CS.

Figure 8:
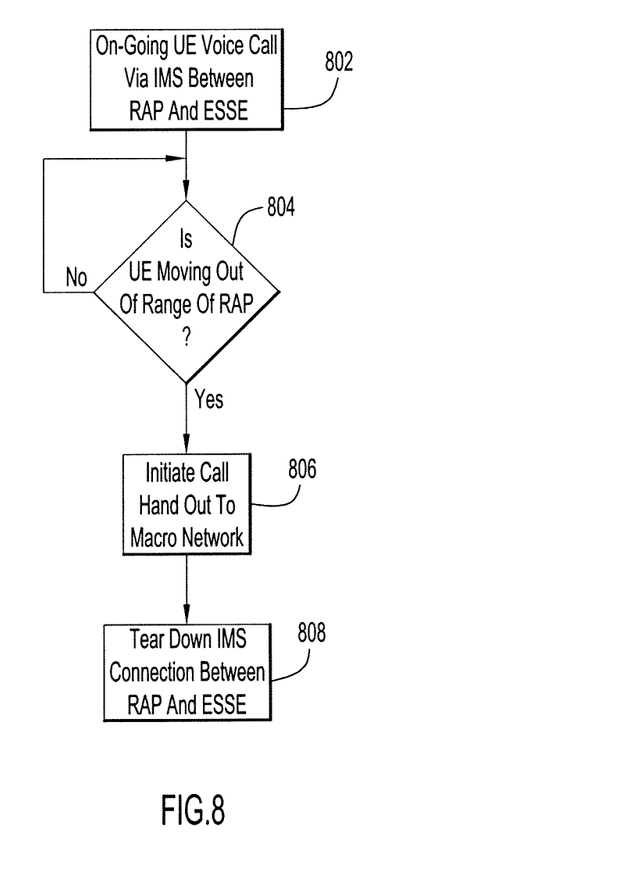
FIG. 8 is a flowchart that depicts a series of steps for changing the anchor of a voice call from the Enterprise to a Mobile Switching Center (MSC).

FIG. 8 depicts a series of steps for changing the anchor of a call from the Enterprise to a Mobile Switching Center (MSC). As shown, the process begins at step 802 wherein there is an ongoing UE voice call supported by IMS between a RAP and the Enterprise. At step 804, the RAP infrastructure (e.g., a single picocell or a picocell controller) determines whether the UE is beginning to move out of range of the RAP infrastructure. If not, then the voice call continues over IMS. If, at step 804, it is determined that the UE is indeed moving out of range, then the process continues with step 806 where the RAP infrastructure initiates call hand out to the macro network. A main sub-step of step 806 is to employ Voice Call Continuity functionality within the macro MSC and the associated IMS Call State Control Function to cause the voice call to be anchored in the MSC. This is accomplished by, e.g., sending a VCC SETUP message to the E.164 Domain Transfer Number, which in turn causes the MSC to send an INVITE message to the CSCF. This process (shown in FIG. 7) establishes the circuit switch access leg for the voice call that is soon to be transferred to the MSC.

Then, at step 808, the direct IMS leg is torn down between the Enterprise and the RAP by having the VCC function send an IMS BYE message to the RAP (or, again, a controller). The RAP, in turn, sends an acknowledgement back to the CSCF, thereby completing the tearing down of the IMS link. Finally, the RAP initiates Serving Radio Network Subsystem (SRNS) relocation (i.e., hard handover) from the picocell infrastructure to the macro network.

From the foregoing, those skilled in the art will appreciate that described herein is a system that not only supports optimal routing of picocell media for authorized session/users, but also enables such a user to move out of picocell range without losing voice call continuity.

Those skilled in the art will appreciate that the picocell architecture described herein provides for the co-location of SIP User Agent functionality with picocell equipment to allow direct access by suitably authorized users to enterprise applications and service, offering enhanced Quality of Experience and improved cost of production for employees accessing on premise.

Although the methods and systems are illustrated and described herein as embodied in one or more specific examples, it is nevertheless not intended to be limited to the details shown, since various modifications and structural changes may be made therein without departing from the scope of the method, and system and within the scope and range of equivalents of the claims. Accordingly, it is appropriate that the appended claims be construed broadly and in a manner consistent with the scope of the method, and system, as set forth in the following claims

What is claimed is:

1. A method, comprising:
at a Radio Access Point (RAP) device in a network, servicing a voice call between mobile User Equipment and an Enterprise Session Initiation Protocol (SIP) Services Environment using, at least in part, Voice over Internet Protocol Multimedia Subsystem (VoIMS);
detecting at the RAP device that the User Equipment is moving out of range of RAP infrastructure servicing the User Equipment; and
in response to detecting, initiating from the RAP device a procedure to hand out the voice call and anchor the voice call in a Mobile Switching Center (MSC) of a macro service provider by sending a voice call continuity (VCC) setup message to a domain transfer number to anchor signaling and media in the MSC, wherein the VCC setup message identifies the MSC to trigger the MSC to send a VCC invite message to the Enterprise SIP Services Environment to allow the User Equipment to access the Enterprise SIP Services Environment via the MSC;
receiving at the RAP device a message from a Call State Control Function (CSCF) in the network to tear down a link between the RAP device and the Enterprise SIP Services Environment;
in response to receiving the message from the CSCF, sending from the RAP device an acknowledgement message to the CSCF confirming the tear down of the link;
determining whether the User Equipment is eligible for enhanced services by analyzing a User Equipment ACCEPT message that comprises SIP registration information; and
receiving the SIP registration information to trigger the RAP infrastructure to perform a SIP register at the RAP device on behalf of the User Equipment.

2. The method of claim 1, wherein determining comprises analyzing a Third Generation Partnership Project (3GPP) 25.469 Home Node B (HNB) Application Part (AP) User Equipment ACCEPT message for an indication that the User Equipment is eligible for enhanced services.

3. The method of claim 1, wherein detecting comprises monitoring RAP signal strength at the User Equipment.

4. The method of claim 1, wherein detecting comprises monitoring a location of the User Equipment.

5. The method of claim 1, wherein initiating comprises generate and sending a Call Setup message in accordance with a voice call continuity function supported by IMS functionality.

6. The method of claim 1, further comprising tearing down the VoIMS service after the voice call is anchored in the MSC.

7. The method of claim 6, wherein the RAP infrastructure identifies a tearing down message as being related to a domain transfer and does not forward the tearing down message to User Equipment.

8. The method of claim 6, further comprising performing a SIP deregister after the voice call is anchored in the MSC.

9. The method of claim 1, wherein the RAP infrastructure comprises a picocell infrastructure.

10. The method of claim 9, wherein a SIP User Agent associated with a picocell or picocell controller performs the step of initiating.

11. A system, comprising:
a Session Initiation Protocol (SIP) User Agent that communicates with an Enterprise SIP Services Environment on-behalf of a User Equipment; and
a radio access point (RAP) that services a mobile User Equipment voice call and supports Voice over Internet Protocol Multimedia Subsystem (VoIMS) between the RAP and the Enterprise SIP Services Environment, wherein the RAP is configured to:
detect when the User Equipment is moving out of range of the RAP;
initiate a procedure to hand out the voice call and anchor the voice call to a Mobile Switching Center (MSC) of a macro service provider by sending a voice call continuity (VCC) setup message to a domain transfer number to anchor signaling and media in the MSC in order to identify the MSC;
receive a message from a Call State Control Function (CSCF) to tear down a link between the RAP and the Enterprise SIP Services Environment;
in response to receiving the message from the CSCF, send an acknowledgement message to the CSCF confirming the tear down of the link;
determine whether the User Equipment is eligible for enhanced services by analyzing a User Equipment ACCEPT message that comprises SIP registration information; and
receive the SIP registration information to trigger the RAP infrastructure to perform a SIP register at the RAP device on behalf of the User Equipment.

12. The system of claim 11, further comprising a RAP controller.

13. The system of claim 11, wherein the RAP is configured to send a Call Setup message to an E.164 Domain Transfer Number in accordance with a VCC function supported by IMS functionality.

14. The system of claim 11, wherein the SIP User Agent is configured to tear down the VoIMS voice call after the voice call is anchored in a Mobile Switching Center (MSC) of a macro network service provider.

15. The system of claim 11, wherein the SIP User Agent is configured to send the VCC setup message to a domain transfer number that identifiers the MSC to trigger the MSC to send a VCC invite message to the Enterprise SIP Services Environment to allow the User Equipment to access the Enterprise SIP Services Environment via the MSC.

16. A non-transitory processor readable medium encoded with instructions that, when executed by a processor, cause the processor to:
detect, at a Radio Access Point (RAP) device that services mobile User Equipment, that the User Equipment is moving out of range of RAP infrastructure servicing the User Equipment;
initiate from the RAP device a procedure to hand out a voice call supported by the RAP and anchor the voice call in a Mobile Switching Center (MSC) of a macro service provider by sending a voice call continuity (VCC) setup message to a domain transfer number to anchor signaling and media in the MSC, wherein the VCC setup message that identifies the MSC to trigger the MSC to send a VCC invite message to a Enterprise Session Initiation Protocol (SIP) Services Environment to allow the User Equipment to access the Enterprise SIP Services Environment via the MSC;

receive at the RAP device a message from a Call State Control Function (CSCF) to tear down a link between the RAP and the Enterprise SIP Services Environment; and in response to receiving the message from the CSCF, sending from the RAP device an acknowledgement message to the CSCF confirming the tear down of the link;

determine whether the User Equipment is eligible for enhanced services by analyzing a User Equipment ACCEPT message that comprises SIP registration information; and receive the SIP registration information to trigger the RAP infrastructure to perform a SIP register at the RAP device on behalf of the User Equipment.

17. The non-transitory processor readable medium of claim 16, further encoded with instructions that, when executed by a processor, cause the processor to:

cause a Call Setup message to be sent to an E.164 Domain Transfer Number.

* * * * *